Patented Aug. 14, 1945

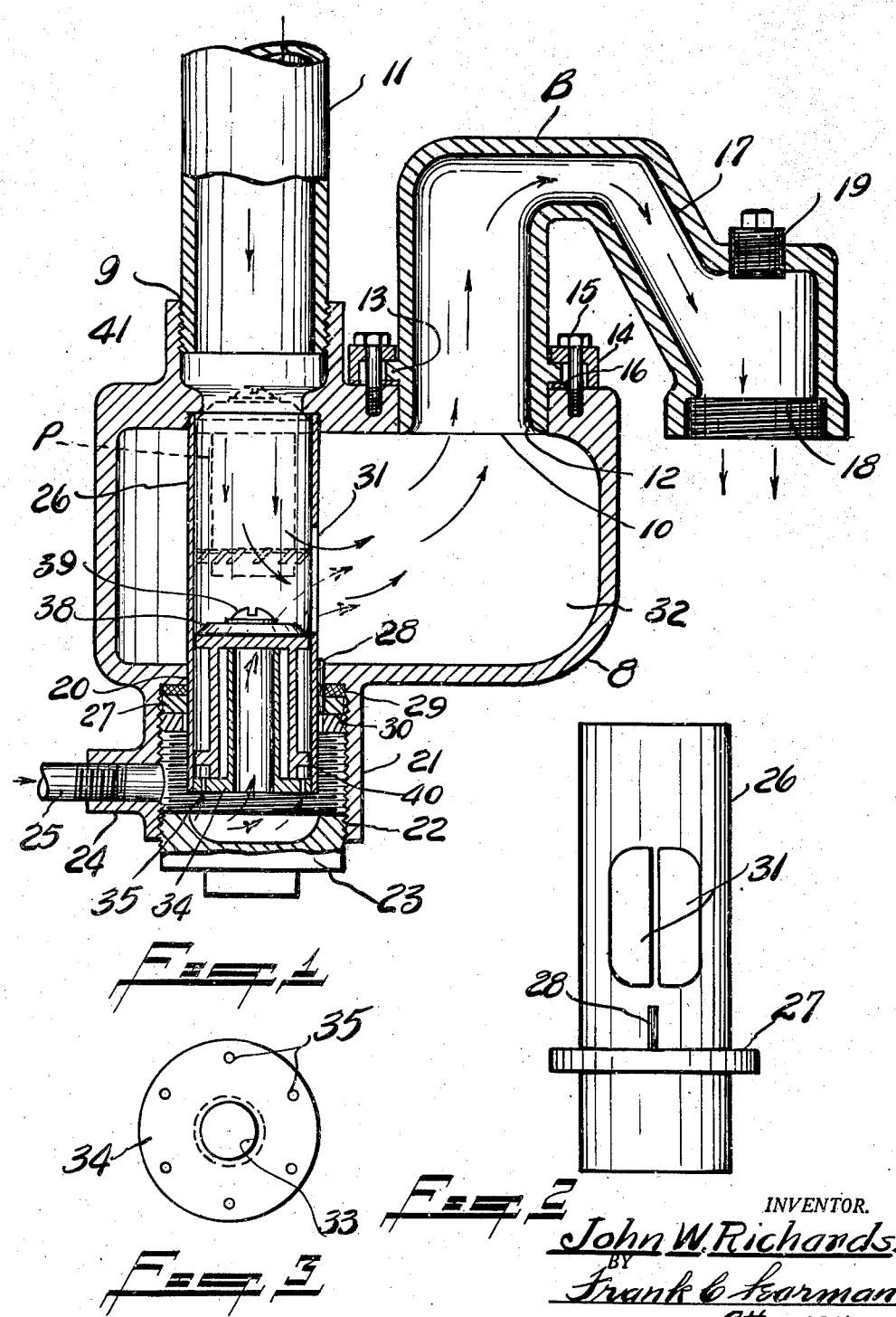

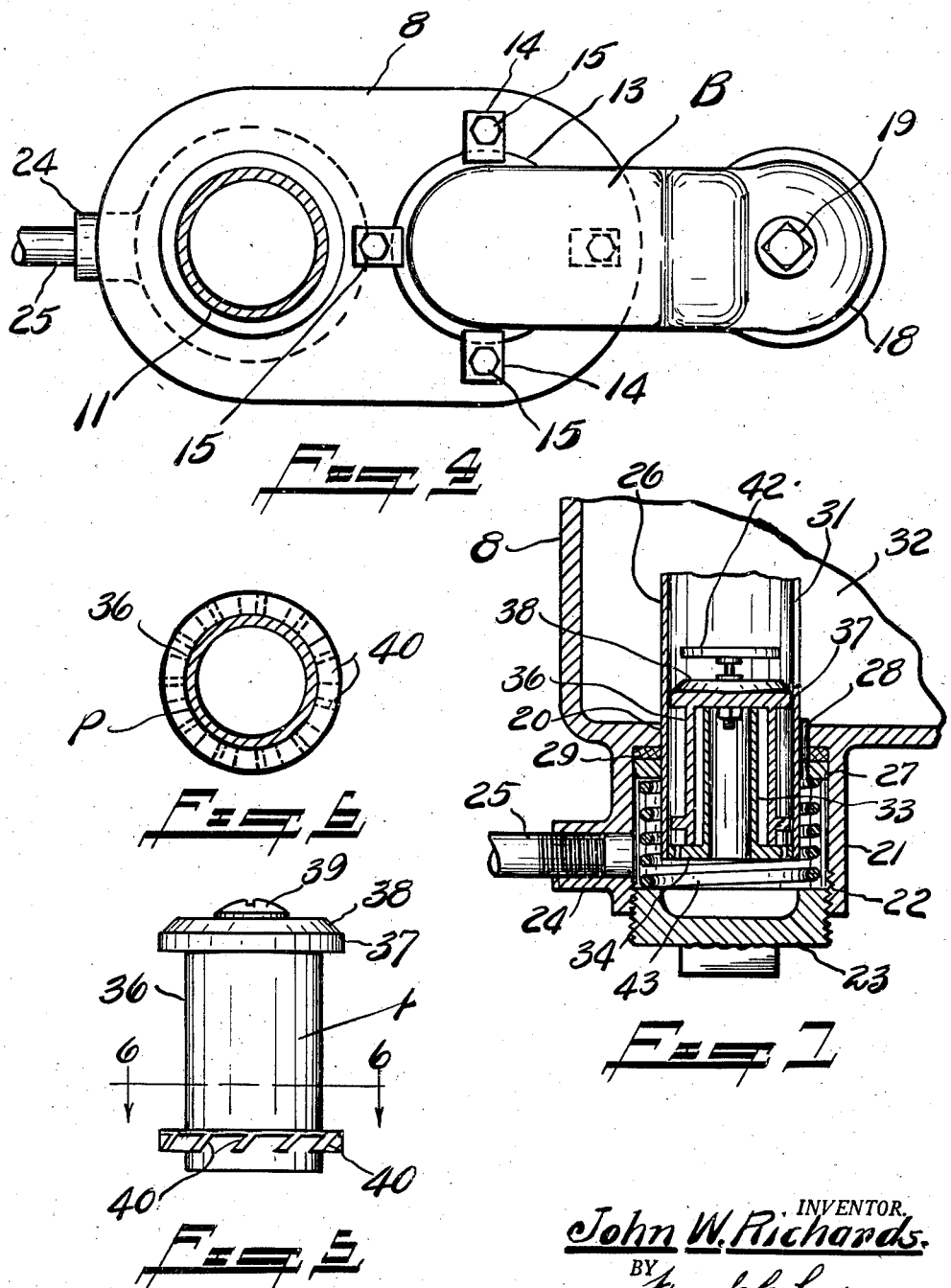

2,382,912

UNITED STATES PATENT OFFICE 2,382,912

WASTE PIPE TRAP

John W. Richards, Essexville, Mich.

Application September 1, 1944, Serial No. 552,325

12 Claims. (Cl. 182—22)

This invention relates to waste traps such as used in waste pipes in houses and dwellings in general, and more specifically to a trap and seal which can be readily cleaned and flushed when clogged, without removal or opening of the trap structure.

One of the prime objects of the invention is to design a simple, practical, and economical trap and seal connected to a suitable source of hot water supply and adapted to be interposed in a waste pipe line below a sink or other appliance, and including a valve actuated by hot water pressure for sealing off communication with the intake end of the waste pipe when the trap is being flushed.

Another object is to design a trap provided with waste water and hot water connections so that the hot water can be utilized for flushing and melting any accumulation of grease or other fatty substances, sediment, or other foreign matter which generally clogs waste traps of the character referred to.

A further object is to provide a seal and trap including a reciprocable plunger valve operable by means of pressure from the hot water line to cut off the flow of waste water to the trap so that the hot water from the hot water line thoroughly cleans said trap.

A further object still is to provide means in the trap for creating turbulence in the trap when the hot water is connected, this materially aiding the cleaning of the structure.

Still other objects and advantages characterizing my invention will become more fully apparent from the description hereinafter set forth of one embodiment or example thereof, having reference to the accompanying drawings.

In the drawings:

Fig. 1 is an elevational, sectional view of my improved waste trap and seal.

Fig. 2 is an enlarged, elevational view of the plunger sleeve.

Fig. 3 is an inverted plan view of the sleeve and plunger assembly.

Fig. 4 is a top plan view of the waste trap.

Fig. 5 is an side elevational view of the valve.

Fig. 6 is a transverse, sectional view taken on the line 6—6 of Fig. 5.

Fig. 7 is a fragmentary, sectional view of the valve showing a slightly modified construction.

Referring now to the drawings, the numeral 8 indicates the main body of the trap, this is preferably cast and is so designed that it can be readily substituted for a standard trap such as is present in common use in dwellings in general.

Inlet and outlet openings 9 and 10 respectively are provided in the trap, the inlet opening 9 being threaded as shown to receive one end of a waste pipe 11, and an overflow assembly B is connected to the outlet as shown, the leg 12 projecting into the opening 10 and is shouldered as at 13, L-shaped clips 14 engaging the shouldered edge, and are bored to accommodate cap screws 15 which are threaded into the main body of the trap, a gasket 16 being provided as shown to provide a tight leak-proof connection, this overflow assembly leads upwardly and thence down at an angle as at 17, terminating in a threaded section 18, to which a pipe (not shown), is connected for emptying into a sewer. A plug 19 is provided in direct vertical alignment with the section 18 and is readily removable to facilitate insertion of drain flushing materials, cleaning devices or the like.

A suitable opening 20 is provided in the lower wall of the main body of the trap in alignment with the inlet opening 9, and a depending cylindrical section 21 is cast integral with the body 8, the lower end being open and is threaded as at 22 to accommodate the plug 23 which forms a closure for said section.

An internally threaded boss 24 projects from one side of the section 21 and a hot water pipe 25 has threaded connection therewith.

A tubular sleeve 26 is mounted in the opening 20, to accommodate the upper end of the sleeve and also serving as a pilot for proper seating of the valve P. A spring 27 is provided on the sleeve 26 at a point intermediate its length, and a pin 28 is provided on the ring to properly locate and position the sleeve. A washer 29 is interposed between the wall of the trap and the ring, and a threaded nut 30 also serves to secure the sleeve in position and bears against the lower face of the ring 27 so that the sleeve may be readily held in position, this necessitates the threading of the member 21, and it will be obvious that all of the parts may be inserted or removed when the plug 23 is unscrewed.

Openings 31 are provided in the sleeve as shown, and the waste water flows therethrough, into the main chamber 32 of the trap, thence through the overflow assembly B, and thence to sewer, the pin 28 properly locating and positioning the sleeve so that the openings 31 open towards the outlet.

A hollow tubular member 33 is mounted in the lower end of the sleeve 26, said member being flanged as shown at 34 to form a closure for the lower end of the sleeve, and a plurality of openings 35 are being provided in said flange and for a purpose to be presently described.

A piston valve P is reciprocatingly mounted in the sleeve 26 and is formed as clearly shown in Figs. 1 and 5 of the drawings, said valve comprising a cylindrical, hollow shell 36 open at its lower end, and terminating in a head 37 to which a resilient sealing member 38 is secured by means of the screw 39. A plurality of annularly disposed vanes 40 are provided intermediate the length of the shell, said vanes serving to create a whirling motion to the valve when the hot water line is opened, and the pressure of the hot water line forces the valve upwardly to seat against the shoulder 41 to seal off the waste water inlet as clearly indicated in broken lines in Fig. 1 of the drawings.

In practice, the piston valve is normally in position as indicated in solid lines in Fig. 1 of the drawings, the waste water entering the sleeve 26 from the waste pipe connection 11, thence flowing through openings 31 into the body 32 of the trap, thence through opening 10 and into the overflow assembly 13 and thence to sewer.

When it is desired to flush and clean the trap, the valve (not shown), in the hot water line 25 is opened to admit hot water to the trap, this hot water, under pressure, forces the valve upwardly, the water being forced through openings 35, striking the vanes 40 to whirl the valve as it travels, so that it creates a turbulence in the tubular shell, the top section 28 of the valve seating against the shoulder 27 and sealing off the waste inlet, the upward travel of the valve uncovers the openings 31 in the sleeve, and the hot water thence flows through openings 31 into chamber 32, and thence through overflow assembly B to sewer, this hot water thoroughly cleaning and melting all fatty substances, and the turbulence agitating all sediment so that it is carried away. When the valve in the hot water line is closed, the valve P will drop of its own weight, back to original position and the waster water inlet will again be open.

The trap can be easily and economically manufactured, the openings 20 and 27 being in vertical alignment and the plugs 19 and 23 are easily removable.

The outlet assembly is also very simple, it can be swung as desired, the cap screws 15 are readily accessible and the plug 19 provides for easy insertion of flushing material.

In Fig. 7 of the drawings I have shown a slightly modified construction in which a brush section 40 is provided on the head of the valve P, this brush serving to assist in cleaning the sleeve and valve seat as it whirls and travels to raised position, the nut 30 is also omitted and a spring 41 is substituted for said nut, this opening serving to hold the parts in assembled relation.

All of the parts are simple and economical to manufacture and assemble, and the outlet assembly can be set at any angle.

When the conventional present day trap becomes clogged, it is necessary to call a plumber who disconnects the trap and cleans it in the basement on location, this disconnecting operation is messy, there is spillage of the greasy waste water and the odor and gases permeate the building, and these disadvantages have all been eliminated in my new design, which merely requires the opening and closing of a valve in the hot water line to effect a thorough cleaning.

From the foregoing description, it will be obvious that I have perfected a very simple, practical and inexpensive trap for the purpose described.

What I claim is:

1. A waste trap of the character described comprising a trap body having a main chamber, waste inlet and outlet pipes opening thereinto, a vertically disposed cylindrical sleeve in alignment with the waste intake opening and a discharge opening intermediate the length of said sleeve, a normally closed water supply pipe open to the lower end of the sleeve, a piston valve mounted for vertical travel in said sleeve, said piston being actuated when the supply pipe is opened to force the piston upwardly to close the waste inlet pipe and establish communication between the water supply pipe, the main chamber and the outlet pipes.

2. A construction as defined in claim 1 in which the main body is formed with a chamber below the main chamber and into which the sleeve extends, and a plug forming a closure for said chamber to facilitate assembly of the sleeve and piston.

3. A construction as defined in claim 1 in which a tubular flanged shell is mounted in the lower end of the sleeve, and spaced angularly disposed perforations provided in said flange.

4. A construction as defined in claim 1 in which angularly disposed vanes are provided on the piston body to provide a whirling movement when the water supply line is opened.

5. A waste trap of the character described comprising a trap body formed with a main chamber, waste inlet and outlet openings into said chamber, a valve seat in the inlet opening, a cylindrical sleeve in vertical alignment with said inlet opening and an outlet port intermediate the length of the sleeve, and opening into the main chamber, a second chamber below and sealed from said main chamber and into which the sleeve extends, a hot water supply pipe opening into said lower chamber, a piston type valve mounted for travel in said sleeve and adapted to be forced into engagement with the valve seat to close the waste inlet when the hot water supply pipe is opened to establish communication with the waste outlet through said sleeve port and main chamber.

6. A construction as defined in claim 5 in which an overflow assembly is connected to the outlet opening.

7. A construction as set forth in claim 5 in which means is provided in the upper end of the piston for cleaning the valve seat and waste inlet opening.

8. A construction as defined in claim 5 in which a removable plug is provided in the lower end of the second chamber, said plug, sleeve and inlet openings being in direct vertical alignment to permit assembly of the sleeve assembly therethrough.

9. A waste trap and seal of the character described comprising, a trap body formed with a main upper chamber and a lower chamber, waste intake and outlet openings in the main chamber, a valve seat in the inlet opening, a sleeve connected to said inlet opening and projecting into said lower chamber, an outlet port in the sleeve and opening into the main chamber, a concentrically arranged open tube in the sleeve and a flange connecting said sleeve and tube, a pressure water supply pipe connected to the lower chamber, a piston type valve telescopically mounted on the concentric tube within the sleeve and adapted to be forced upwardly and against the valve seat when the pressure supply pipe is opened to force water through said sleeve, port, and main chamber for flushing and cleaning said trap.

10. A waste trap and seal of the class described comprising, a trap body formed with a main chamber and a lower chamber normally sealed therefrom, inlet and outlet openings in the main chamber, a vertically disposed sleeve connected to the inlet opening and projecting into said lower chamber, a port in said sleeve and open to said main chamber, vertically reciprocable means in said sleeve for closing said inlet opening under influence of pressure from the water supply line and automatically establishing communication between the water supply pipe and the waste water outlet to flush said valve, and an overflow assembly adjustably connected to said outlet opening.

11. The construction as defined in claim 10 in which a clean-out plug is provided directly about the outlet in the overflow assembly.

12. A construction as defined in claim 10 in which the vertically reciprocable means is provided with angularly disposed vanes on the body thereof for whirling said inlet closing means when the water supply line is opened.

JOHN W. RICHARDS.